Patented Sept. 20, 1949

2,482,590

UNITED STATES PATENT OFFICE 2,482,590

REDUCTION OF VISCOSITY OF MOLTEN SULFUR BY MEANS OF PHENOLIC COMPOUNDS

Leroy F. Marek, Lexington, and Alexander Bogrow, Brighton, Mass., assignors to Arthur D. Little, Inc., Cambridge, Mass., a corporation of Massachusetts No Drawing. Application December 31, 1946, Serial No. 719,630

10 Claims. (Cl. 23—224)

This invention relates to the reduction of the maximum viscosity of molten sulfur, and more particularly to effecting such reduction by the addition of certain phenols and phenol derivatives to sulfur.

Sulfur is a relatively cheap and plantiful material having many diverse uses. A well known characteristic of sulfur, however, which limits its use for some of the purposes to which it might be put, is the great increase in viscosity which takes place when molten sulfur is heated. As the temperature of liquid sulfur is raised above its melting point (about 120° C.) to temperatures beyond about 158° C., its viscosity increases to a maximum and for pure sulfur may reach a viscosity of about 93,000 centipoises at 186° C.–188° C. If the temperature is raised further, the viscosity of molten sulfur gradually decreases, until, at 444.6° C., the boiling point at normal pressure, it is about 100 centipoises. Several materials are known which greatly modify the viscosity of molten sulfur when added in small quantities, such as halogens and certain sulfides. These known materials, however, are expensive, volatile (or gaseous), or more or less difficult to handle, or else they may not be suitable for some particular uses to which the molten sulfur may be put.

It is an object of this invention to reduce the maximum viscosity of molten sulfur by the addition of small quantities of relatively inexpensive materials not having the disadvantages of presently known sulfur viscosity reducing agents. Other objects will appear hereinafter.

These objects are accomplished by the addition to sulfur of 5% by weight, or less, of a member of the group consisting of unsubstituted or hydroxy-substituted polynuclear phenols, and of mononuclear phenols substituted by one or more radicals of the group consisting of hydroxyl, alkyl, or cycloalkyl. The addition may be advantageously made by mixing the selected phenol with solid sulfur, or with molten sulfur in its relatively fluid state, i. e. between about 120° C. and about 158° C.

For carrying out our invention, various phenols, substituted by a variety of groups, have been tested. It has been found that the effect of a true sulfur viscosity reducing agent is so marked that when it is used in an amount of about 1% by weight, based on the weight of the sulfur, the maximum viscosity of molten sulfur is reduced in many cases from thousands of centipoises to less than 100 centipoises, and, in any event, below 500 centipoises. If, however, a material is not a true sulfur viscosity reducing agent, amounts of it even in excess of 5% by weight on the sulfur have little or no influence on the viscosity of sulfur.

The materials which serve, in accordance with the present invention, to reduce the viscosity of molten sulfur below 500 centipoises maximum are phenolic compounds represented by the formulas:

(1)
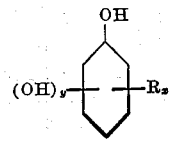

and (2)
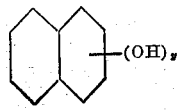

wherein R is alkyl or cycloalkyl, and $x$ plus $y$ must equal at least one. Thus, Formula 1 represents phenol having one or more of the groups —OH, alkyl, or cycloalkyl substituted for hydrogen atoms on the nuclear carbon atoms, and Formula 2 represents naphthalene having one or more —OH groups substituted for hydrogen atoms on the nuclear carbon atoms.

When both $x$ and $y$ are zero, the resulting compounds (phenol and naphthalene) are ineffective for the purposes of this invention. Likewise ineffective for these purposes are compounds of Formulas 1 and 2 wherein R is a radical such as phenyl, halogen, nitro, aldehyde, or acid, e. g. such compounds as the hydroxy diphenyls, the mono-, di-, and tri-chloro phenols, the nitrophenols, 3-ethoxy 4-hydroxybenzaldehyde, salicylic acid, etc.

The simplest compounds meeting the definitions of Formulas 1 and 2 are the cresols, the dihydroxy benzenes, and the mono-hydroxy naphthalenes. Of these three groups, the cresols are effective to reduce the maximum viscosity of molten sulfur well below the 500 centipoise value required by the present invention, while the other two groups are still more effective, as shown by Table I below. In this table appear the maximum viscosity measurements of molten sulfur when using a number of the phenols coming within the scope of the present invention. The viscosities were measured by standard procedures, using a calibrated efflux type viscosimeter and recalculating the results as absolute viscosities, in centipoises. The phenols were mixed with the unmolten sulfur in the amount of 1%, by weight, on the sulfur; the temperature was then raised, with stirring as required, to that indicated in the second column, and the viscosity was measured at that temperature. From an extensive investigation of these and other phenols, it appears in general to be true that an —OH substituent is more effective than a —CH₃ substituent, and also that the effectiveness of the phenol increases as the number of carbon atoms in the R substituent (or substituents) increases. In this Table I appear representative phenols effective in the present invention to reduce the maximum viscosity of molten sulfur, when used therewith in the amount of about 1% as stated above, to about 100 centipoises or below:

Table I

| Name of phenol added | Temperature, °C. | Absolute Viscosity, Centipoises |
|---|---|---|
| 5-Hydroxy-1,3-dimethyl-benzene | 192 | 94.0 |
| 4-Hydroxy-1,2-dimethyl-benzene | 193 | 74.5 |
| o-Amylphenol | 192 | 69.3 |
| p-tert-Amylphenol | 194 | 63.8 |
| p-Cyclohexylphenol | 193 | 26.5 |
| Catechol | 193 | 83.0 |
| Resorcinol | 194 | 59.0 |
| Hydroquinone | 193 | 87.5 |
| Pyrogallol | 193 | 51.1 |
| 1-Naphthol | 193 | 46.2 |
| 2-Naphthol | 192 | 51.8 |
| 1-5-Dihydroxynaphthalene | 193 | 59.1 |

The temperature of about 193° C. was selected for the tests shown above, because the maximum viscosity of both the pure sulfur and the sulfur plus the added phenolic compound occur in the vicinity of that temperature, hence, these tests are under substantially the severest temperature conditions. At temperatures appreciably above and below those of Table I, the values for the viscosities are below those shown.

In connection with Table I, the viscosity reducing agents were added in an amount of 1% by weight based on the weight of sufur. This amount may be varied considerably, as indicated for example by the results for p-cyclohexylphenol given below:

Table II

| | Percent Added | Temperature, °C | Absolute Viscosity, Centipoises |
|---|---|---|---|
| p-cyclohexylphenol | 1.0 | 193 | 26.5 |
| | 0.5 | 193 | 36.9 |
| | 0.2 | 193 | 76.1 |

Varying amounts of other suitable agents have similarly been tried. It is found that there is no advantage in adding more than 5% of any of these agents. All of them follow the same trend as shown above in Table II, and amounts as low as 0.1% are frequently still satisfactory, though the viscosity is in general two to three times greater that that occurring upon the addition of 0.2% of the agent.

The usefulness of reducing the viscosity of sulfur so that it may be used as a heat transfer agent is apparent. Also, in the manufacture of carbon bisulfide such agents aid materially, as shown in the copending U. S. application Ser. No. 597,823, now Patent No. 2,424,894, dated June 29, 1947, of Leroy F. Marek, one of the present applicants.

The above descriptions and examples are intended to be illustrative only. Any modifications thereof, or variations therefrom, which conform to the spirit of this invention are deemed within the scope of the appended claims.

We claim:

1. A composition of matter having as its major ingredients sulfur and a trihydroxy benzene, said trihydroxy benzene being present in an amount not greater than 5%, said composition being characterized by having a maximum viscosity of less than 500 centipoises when molten.

2. A composition of matter having as its major ingredients sulfur and resorcinol, said resorcinol being present in an amount not greater than 5%, said composition being characterized by having a maximum viscosity of less than 500 centipoises when molten.

3. A composition of matter having as its major ingredients sulfur and cyclohexylphenol, said cyclohexylphenol being present in an amount not greater than 5%, said composition being characterized by having a maximum viscosity of less than 500 centipoises when molten.

4. A composition of matter having as its major ingredients sulfur and a hydroxy compound, said hydroxy compound being present in an amount not greater than 5% by weight on the weight of sulfur and having the formula $$(OH)_y\text{---}\bigcirc\text{---}R_x$$

where R is selected from the group consisting of alkyl and cycloalkyl, $x$ is selected from the numbers 0, 1 and 2, $y$ is selected from the numbers 1 to 3 and when $x$ is 0, $y$ is selected from the numbers 2 and 3, said composition being characterized by having a maximum viscosity of less than 500 centipoises when molten.

5. The composition according to claim 4 where $x$ is 0.

6. The composition according to claim 4 where $y$ is 1.

7. The process of reducing the maximum viscosity of molten sulfur below 500 centipoises which comprises the steps of mixing with sulfur less than 5% by weight of a hydroxy compound of the formula $$(OH)_y\text{---}\bigcirc\text{---}R_x$$

where R is selected from the group consisting of alkyl and cycloalkyl, $x$ is selected from the numbers 0, 1, and 2, $y$ is selected from the numbers 1 to 3, and when $x$ is 0, $y$ is selected from the numbers 2 and 3, and heating the mixture to a temperature betwen 170° C. and about 445° C.

8. The process according to claim 7 where $x$ is 0.

9. The process according to claim 7 where $y$ is 1.

10. The process according to claim 9 where R is cycloalkyl.

LEROY F. MAREK.
ALEXANDER BOGROW.

REFERENCES CITED

The following references are of record in the file of this patent:

UNITED STATES PATENTS

| Number | Name | Date |
|---|---|---|
| 2,061,185 | Ceccon | Nov. 17, 1936 |

OTHER REFERENCES

Mellor, "Inorganic and Theoretical Chemistry," vol. 10, p. 100, pub. by Longmans, Green & Co., London.

Chemical Abstracts, vol. 31, page 4578 (1937).